(12) United States Patent
Veasey

(10) Patent No.: US 10,350,643 B2
(45) Date of Patent: Jul. 16, 2019

(54) TRANSPORTATION VEHICLE FOR MOBILE SORTING OF SHIPMENTS

(71) Applicant: Deutsche Post AG, Bonn (DE)

(72) Inventor: Mark Veasey, Bonn (DE)

(73) Assignee: DEUTSCHE POST AG, Bonn (DE)

( * ) Notice: Subject to any disclaimer, the term of this patent is extended or adjusted under 35 U.S.C. 154(b) by 0 days.

(21) Appl. No.: 15/788,472

(22) Filed: Oct. 19, 2017

(65) Prior Publication Data

US 2018/0111164 A1 Apr. 26, 2018

(30) Foreign Application Priority Data

Oct. 20, 2016 (GB) .................................. 1617756A

(51) Int. Cl.
| | |
|---|---|
| *B07B 13/16* | (2006.01) |
| *B60P 1/36* | (2006.01) |
| *B07C 5/36* | (2006.01) |
| *B23P 21/00* | (2006.01) |
| *B65G 37/00* | (2006.01) |
| *B65G 41/00* | (2006.01) |

(Continued)

(52) U.S. Cl.
CPC .............. *B07B 13/16* (2013.01); *B07C 5/368* (2013.01); *B23P 21/006* (2013.01); *B60P 1/36* (2013.01); *B60P 3/007* (2013.01); *B65G 37/005* (2013.01); *B65G 41/002* (2013.01); *B65G 2047/687* (2013.01)

(58) Field of Classification Search
CPC ................................... B07B 13/16; B60P 1/36
USPC ......... 700/230; 198/312, 314, 444; 414/343, 414/351, 352, 353
See application file for complete search history.

(56) References Cited

U.S. PATENT DOCUMENTS

| | | | | |
|---|---|---|---|---|
| 6,520,729 B1 * | 2/2003 | Gibson | ..................... | B61D 3/04 |
| | | | | 198/465.2 |
| 7,218,982 B1 * | 5/2007 | Koenig | .................. | G06Q 10/00 |
| | | | | 700/100 |

(Continued)

FOREIGN PATENT DOCUMENTS

FR 2735996 1/1997

OTHER PUBLICATIONS

Search Report for Application No. GB1617756.0; dated Mar. 17, 2017—2 pages.

*Primary Examiner* — Douglas A Hess
(74) *Attorney, Agent, or Firm* — Dority & Manning, P.A.

(57) ABSTRACT

Example aspects relate to at least one transportation vehicle for mobile sorting of shipments, the transportation vehicle comprising a loading area arranged on the transportation vehicle, at least one infeed conveyer foldable attached to the loading area for loading an incoming shipment onto the transportation vehicle, at least two outfeed conveyers foldable attached to the loading area for unloading an outgoing shipment from the transportation vehicle, a scanning device arranged on the loading area adjacent to the at least one infeed conveyer and configured to scan the incoming shipment for obtaining a scanning information, a main conveyer arranged on the loading area and configured to convey the incoming shipment past the scanning device towards a sorting device, and the sorting device configured to sort the scanned incoming shipment according to the scanning information towards one of the outfeed conveyers for unloading the incoming shipment as outgoing shipment.

20 Claims, 2 Drawing Sheets

(51) Int. Cl.
*B60P 3/00* (2006.01)
*B65G 47/68* (2006.01)

(56) References Cited

U.S. PATENT DOCUMENTS

| | | | | |
|---|---|---|---|---|
| 7,603,299 | B1* | 10/2009 | Dewey, Jr. | G06Q 10/0631 |
| | | | | 700/32 |
| 7,967,543 | B2* | 6/2011 | Criswell | B65G 67/08 |
| | | | | 414/373 |
| 8,554,361 | B2* | 10/2013 | Krener | G06Q 10/087 |
| | | | | 700/229 |
| 8,562,277 | B2* | 10/2013 | Criswell | B65G 67/08 |
| | | | | 414/398 |
| 8,996,159 | B2* | 3/2015 | Franzen | B65G 63/004 |
| | | | | 700/213 |
| 9,457,970 | B1* | 10/2016 | Zevenbergen | B65G 67/02 |
| 9,514,430 | B2* | 12/2016 | Miette | B07C 3/02 |
| 9,533,695 | B2* | 1/2017 | Luddeneit | B61D 3/20 |
| 9,688,489 | B1* | 6/2017 | Zevenbergen | B65G 67/20 |
| 9,701,483 | B1* | 7/2017 | Snook | B07C 5/36 |
| 9,744,669 | B2* | 8/2017 | Wicks | B25J 9/1664 |
| 10,137,816 | B2* | 11/2018 | Harper | B60P 1/36 |
| 2003/0175429 | A1 | 9/2003 | Molnar et al. | |
| 2012/0177467 | A1 | 7/2012 | Corrigan et al. | |
| 2016/0221768 | A1 | 8/2016 | Kadaba et al. | |

* cited by examiner

US 10,350,643 B2

TRANSPORTATION VEHICLE FOR MOBILE SORTING OF SHIPMENTS

PRIORITY STATEMENT

The present application claims the benefit of priority under 35 U.S.C. § 119 to Great Britain Application No. 1617756.0, filed on Oct. 20, 2016.

FIELD OF INVENTION

The invention relates to a transportation vehicle for mobile sorting of shipments, wherein the transportation vehicle comprises a loading area arranged on the transportation vehicle.

BACKGROUND

Today's logistic operations for sorting shipments are characterized by a high degree of automation and comprise specialized computer software systems and automated machinery for facilitating and achieving an effective sorting. As a consequence any disruption of the specialized sorting systems by an incident results in serious delays and exorbitant costs. Incidents disrupting the sorting may comprise natural disasters, socio political incidents, hazards and other operational incidents. Further, the high degree of automation often leads to an inflexibility in terms of spontaneous capacity expansions, as the engineering and manufacturing effort for expanding the complex sorting systems requires significant financial and temporal effort.

SUMMARY OF SOME EMBODIMENTS OF THE INVENTION

Example aspects of the present disclosure provide a flexible possibility for sorting shipments usable in case of incidents or for temporary capacity expansion.

One example aspect of the present disclosure is directed to at least one transportation vehicle for mobile sorting of shipments, the transportation vehicle comprising a loading area arranged on the transportation vehicle, at least one infeed conveyer foldable attached to the loading area for loading an incoming shipment onto the transportation vehicle, at least two outfeed conveyers foldable attached to the loading area for unloading an outgoing shipment from the transportation vehicle, a scanning device arranged on the loading area adjacent to the at least one infeed conveyer and configured to scan the incoming shipment for obtaining a scanning information, a main conveyer arranged on the loading area and configured to convey the incoming shipment past the scanning device towards a sorting device, the sorting device configured to sort the scanned incoming shipment according to the scanning information towards one of the outfeed conveyers for unloading the incoming shipment as outgoing shipment.

Example aspects of the present disclosure can provide a mobile sorting facility for sorting shipments, which can be flexibly used, for example, in case of a malfunction of an existing sorting facility or of a building of a logistics provider or for dynamically enhancing sorting capacity of the existing sorting facility. In case of an incident, for example due to a natural disaster, a socio political incident, due to a hazard or due to another operational incident, the (at least one) transportation vehicle can be flexibly used for sorting shipments such as letters, packets or other shippable freight or pieces to a cage, van, bike, small truck or the like arranged at the outfeed conveyers. The shipment to be sorted can be simply pushed by a person onto the infeed conveyer and will be sorted and finally automatically transferred onto the out-feed conveyer. As the infeed conveyer and the outfeed conveyers are foldable attached to the transportation vehicle, the conveyers can be simply folded up for moving the transportation vehicle or folded down, for example on a yard of the logistics provider, for sorting the shipments at a temporal place. Thus, the mobile sorting transportation vehicle can provide a very flexible and cost effective possibility to sort shipments at different geographical locations.

The scanning information can be provided as a 2D-barcode, for example as a QR-code, and comprises information about a destination of the incoming shipment. The incoming shipment, once conveyed by the infeed conveyer onto the main conveyer and thereafter conveyed along the scanning device for obtaining the scanning information, is thereafter further conveyed by the main conveyer towards the sorting device, which then conveys, pushes and/or moves the incoming shipment as outgoing shipment onto the respective outfeed conveyer. A selection of an appropriate outfeed conveyer is done by the sorting device in accordance with the scanning information. The loading area is for example provided as a trailer bed, on which the main conveyer, the scanning device and the sorting device are installed.

According to an example embodiment the transportation vehicle comprises a side wall at least partially surrounding the loading area and arranged at an edge of the loading area, the at least one infeed conveyer and the at least two outfeed conveyers are foldable from a loading position for loading the incoming shipment and unloading the outgoing shipment and a folded position for moving the transportation vehicle, and the at least one infeed conveyer and the at least two out-feed conveyers form a part of the side wall in the folded position. This way the at least one infeed conveyer and the at least two outfeed conveyers can be easily stored when moving the transportation vehicle. In some embodiments, the side wall comprises openings, which are closeable by the folded at least one infeed conveyer respectively by the at least two outfeed conveyers. In some embodiments, in the folded position, the respective conveyer extends along its longitudinal extension in vertical direction from the trailer bed towards a trailer roof. The side wall is provided such that, when all conveyers are folded, the side wall and the conveyers completely surround the loading area along all edges thereof.

According to a some embodiments the (at least one) infeed conveyer and the at least two outfeed conveyers form a seamless part of the side wall in the folded position or the side wall comprises a side curtain and the at least one infeed conveyer and the at least two outfeed conveyers closely fit the side curtain in the folded position. The side curtain may comprise said openings or may surround all edges of the loading area from the trailer bed or a side panel of the loading area up to the trailer roof. In one embodiment, before unfolding the conveyers, first the side curtain has to be removed. Once removed, the conveyers can be unfolded such that one transverse side of the respective conveyers extends from the loading area inclining towards its other traverse side facing ground or arranged on a pillar for simplifying loading the conveyer with the incoming shipment. For folding the conveyers, first the side curtain has to be placed along the side walls of the transportation vehicle. Thereafter the conveyer can be folded for example in an upright position thereby fixing the side curtain. The side curtain preferably comprises a flexible material. In an alternative embodiment the side wall comprises a rigid material, for example aluminum. Forming a seamless part of the side wall in the folded position provides a low air wind resistance of the transportation vehicle.

In some embodiments the (at least one) infeed conveyer and/or the at least two outfeed conveyers comprise an upper side comprising conveyer rolls and a smooth bottom side facing away from the conveyer rolls. A smooth bottom side means for example a roughness identical or comparable to the side wall and provides a low air wind resistance. All conveyers are preferably electrically powered thus allowing an easy and automatic conveying of shipments.

According to some embodiments the (at least one) transportation vehicle comprises a first transportation vehicle and at least one second transportation vehicle, wherein the at least one infeed conveyer and the scanning device are arranged on the first transportation vehicle, the at least two outfeed conveyers and the sorting device are arranged on the (at least one) second transportation vehicle and the main conveyer extends from the first transportation vehicle towards the at least one second transportation vehicle. In a further preferred embodiment the (at least one) infeed conveyer, the scanning device, the (at least two) outfeed conveyers, the main conveyer and the sorting device are arranged on the same transportation vehicle. In an even further embodiment the at least one transportation vehicle comprises a plurality of transportation vehicles, which are inter-connectable by the main conveyer. Some of said transportation vehicles may comprise an infeed conveyer and a scanning device and others may comprise outfeed conveyers and a sorting device or a mixture thereof.

In some embodiments the (at least one) transportation vehicle comprises a conveyer connection part adapted for connecting the main conveyer between the first transportation vehicle and the at least one second transportation vehicle in a straight, curved and/or lowering direction. This way the first transportation vehicle and the at least one second transportation vehicle can be placed staggered or off-centered to each other or on different altitude levels. Further, the conveyer connection part allows for an easy connection and disconnection of the first transportation vehicle and the at least one second transportation vehicle. Preferably, the conveyer connection part is provided as seamless part of the main conveyer and/or comprises conveyer rolls.

According some embodiments, the at least one transportation vehicle is provided as a trailer or as a truck or comprising a first transportation vehicle and at least one second transportation vehicle, wherein the first transportation vehicle is provided as a truck and the at least one second transportation vehicle is provided as a trailer. A tractor unit can be provided for easily moving the trailer from one place to another place.

In some embodiments, the loading area comprises two opposite longitudinal sides extending in driving direction of the transportation vehicle, the (at least one) transportation vehicle comprising an even plurality of infeed conveyers arranged opposite to each other at the longitudinal sides of the loading area and/or an even plurality of outfeed conveyers arranged in pairs opposite to each other at the longitudinal sides of the loading area. Preferably, the transportation vehicle comprises 2, 4 or 8 infeed conveyers and/or outfeed conveyers. The loading area preferably comprises a rectangular extension. Thus, the infeed conveyer and/or the outfeed conveyer preferably extend, when unfolded for conveying operation, in a direction perpendicular away from the longitudinal sides.

According to some embodiments the loading area comprises two opposite longitudinal sides extending in driving direction of the transportation vehicle and at least one transverse side arranged perpendicular thereto, the at least one transportation vehicle comprising an outfeed link conveyer foldable attached to the loading area for unloading an outgoing shipment from the transportation vehicle, wherein the outfeed link conveyer is arranged on a transverse side and/or on a longitudinal side of the loading area and adapted for connecting to a locally fixed conveyer. This way the transportation vehicle can be easily connected to an existing locally fixed conveyer of an existing sorting facility or to a building of a logistics provider for enhancing the sorting capacity of the logistics provider. Preferably, the outfeed link conveyer is connected to the main conveyer and/or to the sorting device such that the sorting device can assign an incoming shipment to the outfeed link conveyer to be delivered thereon as outgoing shipment.

The scanning device can be provided in different manners. According to some embodiments, the scanning device comprises a top read scanning tunnel, a two-way sorting device and/or a presorting device. Preferably, the scanning device comprises a laser scanner for scanning a 2D-barcode provided on the incoming shipment.

In some embodiments, the at least one infeed conveyer and/or the at least two outfeed conveyers comprise a transverse side and are attached with their transverse side for swivel movement to the loading area. Preferably, the at least one infeed conveyer and/or the at least two outfeed conveyers are pivotally attached at the loading area such that incoming shipments can be automatically conveyed from the infeed conveyer onto the main conveyer respectively from the main conveyer via the sorting device towards the outfeed conveyer.

In some embodiments the at least one transportation vehicle comprises a computer control configured for controlling the at least one infeed conveyer, the at least two outfeed conveyers, the scanning device, the main conveyer and the sorting device and/or configured for electrically connecting to a fixed computer control of a locally fixed conveyer. The computer control preferably comprises a microprocessor and respective program code executed thereon for operating the conveyer, the sorting device and the scanning device. Furthermore, the computer control preferably comprises an interface for interconnecting with the existing locally fixed conveyer of the existing sorting facility and/or with the building of the logistics provider for enhancing the sorting capacity.

According to some embodiments the sorting device is provided as a pop-up sorter, a shoe sorter and/or a pop-up wheel sorter. With a shoe sorter, shipments are often conveyed on chain driven profiles and sorted by guided shoes 30° or 90° to conveying direction. The shoes are mechanically controlled, preferably by the computer control. The pop up sorter is preferably provided as bidirectional pop up wheel system. Shipments are often inducted or merged at the pop up sorter at one side of the scanning device tunnel and conveyed on a belt to the sorting device which can sort the shipments for example in the angles 30° or 45° to the conveying direction. Pop-up sorters often contain different rows of wheels, which will turn in the direction to which the shipments needs to be sorted towards the respective outfeed conveyer or can be used for merging on to the belt.

Other example embodiments of the invention will be described in the following with reference to the figures. It has to be noted that the figures are only provided for illustration of the general concept of the invention by examples not defining the scope of protection of the invention. The figures are not drawn to scale. Features shall not be considered to be essential for the present invention because they are depicted in the figures.

BRIEF DESCRIPTION OF THE FIGURES

In the figures

DETAILED DESCRIPTION OF THE FIGURES

Example aspects of the invention will be described in the following with reference to exemplary embodiments showing two transportation vehicles 1 for mobile sorting of shipments 2 in FIG. 1 according to a first embodiment and another transportation vehicle 1 for mobile sorting of shipments 2 in FIG. 2 according to a second embodiment.

Figure 1:
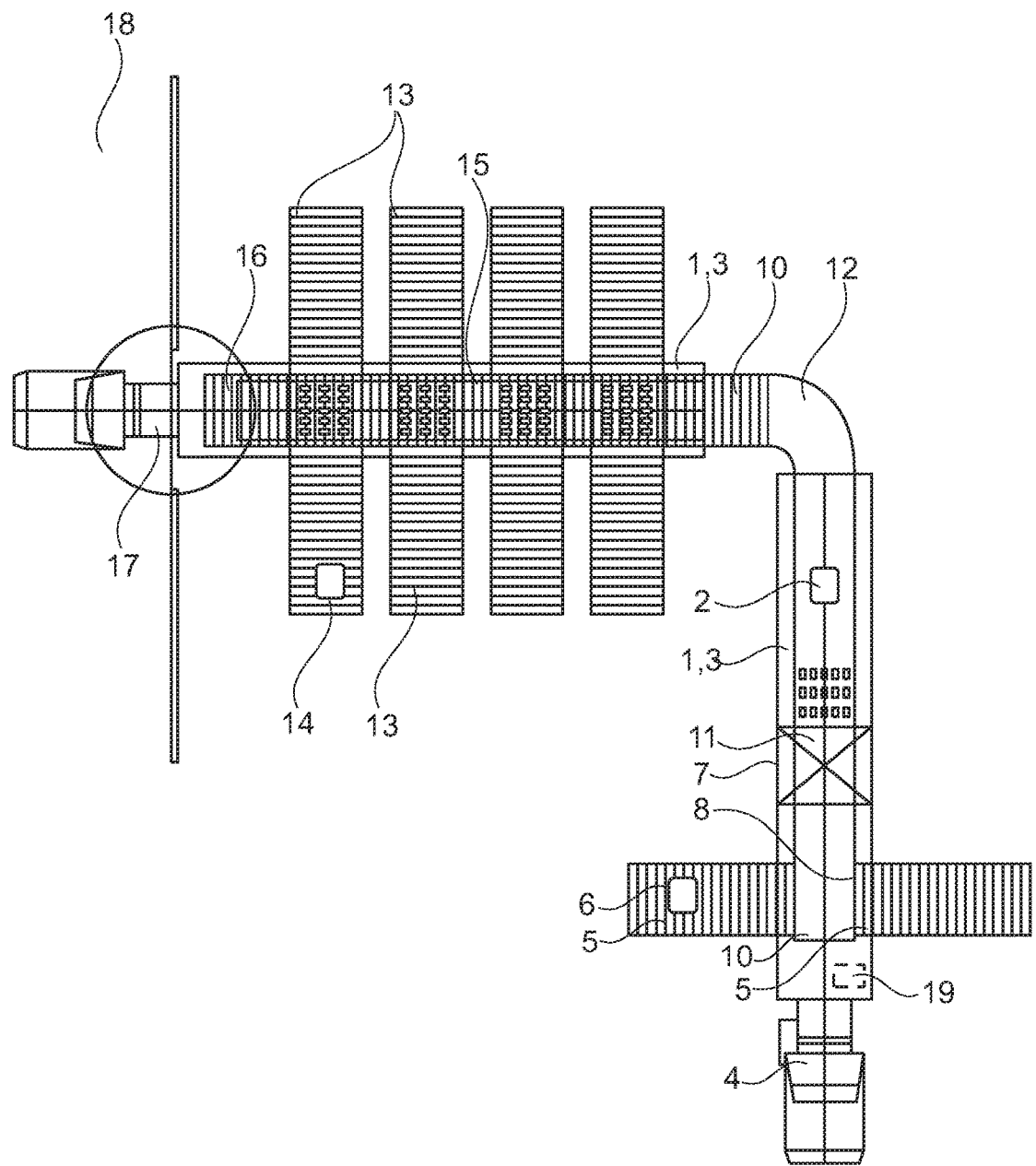
FIG. 1 shows an exemplary embodiment according to the invention in a schematic top-view.
Figure 2:
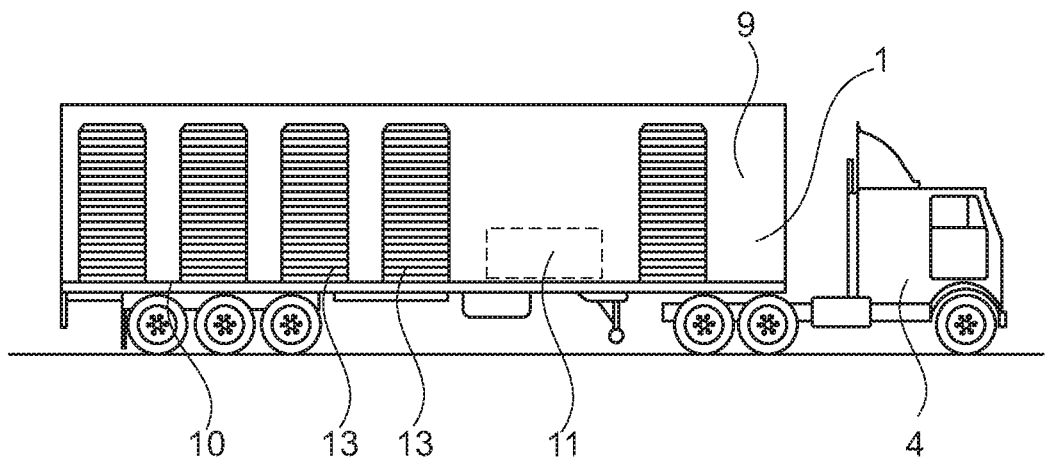
FIG. 2 shows another exemplary embodiment according to the invention in a schematic side and rear view.
Figure 2:
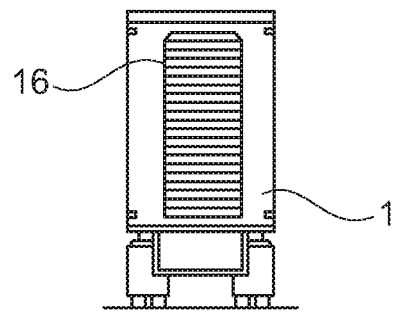

Each of the two transportation vehicles 1 shown in FIG. 1 according to a first embodiment as well as the transportation vehicle 1 shown in FIG. 2 according to the second embodiment comprise a loading area 3 arranged on the respective transportation vehicle 1. The two transportation vehicles 1 shown in FIG. 1 are provided as trailers that are arranged along their longitudinal extensions perpendicular to each other and are movable by a tractor unit 4, to which one of the transportation vehicles 1 is attached. Thus, the loading area 3 of the two transportation vehicles 1 shown in FIG. 1 is provided as a trailer bed. The transportation vehicle 1 shown in FIG. 2 is provided as a truck such that the loading area 3 is provided on a cargo area of the truck. While not shown, the transportation vehicles 1 are parked on a yard of a logistics facility.

The first transportation vehicle 1 attached to the tractor unit 4 is equipped with two infeed conveyers 5 for loading an incoming shipment 6 onto the transportation vehicle 1. The two infeed conveyers 5 are arranged opposite to each other at longitudinal sides 7 of the loading area 3. A transverse side 8 of each of the infeed conveyers 5 is foldable attached to the loading area 3 such that the two infeed conveyers 5 are foldable from a loading respectively unfolded position for loading the incoming shipment 6 and a folded position for moving the transportation vehicle 1. FIG. 1 shows the loading position, wherein the two infeed conveyers 5 extend away from the loading area 3 so that incoming shipments 6 can be placed onto the two infeed conveyers 5. FIG. 2 shows the folded position, wherein the infeed conveyer 5 extends vertically from the trailer bed towards a trailer roof respectively from the cargo area towards a cargo roof.

The loading area 3 is surrounded by a side wall 9 arranged at an edge of the loading area 3 and comprises openings, which are closeable by the two infeed conveyers 5 in the folded position. In particular, in the folded position, the two infeed conveyers 5 form a seamless part of the side wall 9. Therefore, the infeed conveyers 5 comprise a smooth bottom side facing away from conveyer rolls arranged on their upper side shown in FIG. 1. The side wall 9 of the transportation vehicle 1 shown in FIG. 1 is provided as a rigid side wall 9. In a further not shown embodiment the side wall 9 is provided as a flexible side curtain, which either has to be removed first for unfolding the two infeed conveyers 5 from the folded position into the loading position. Alternatively, first the side curtain is closed and thereafter the two infeed conveyers 5 are folded up into the folded position and thereby press against the flexible side curtain for fixing said side wall 9 against wind or the like when moving the transportation vehicle 1.

A main conveyer 10 is arranged on the loading area 3 and extends between its both ends in longitudinal direction of the loading area 3. At one end the main conveyer 10 is arranged adjacent to the two infeed conveyers 5 so that incoming shipments 6 placed on one of the two infeed conveyers 5 are automatically further conveyed by the main conveyer 10 towards a scanning device 11. The scanning device 11 is provided as a top read scan tunnel through which an incoming shipment 6 is further conveyed, shown as shipment 2, by the main conveyer 10. The scanning device 11 scans the incoming shipment 6 with a laser scanner for obtaining a scanning information provided as a 2D-barcode and comprising information about a destination of the incoming shipment 6. In FIG. 2 the scanning device 11 is shown with a dotted line.

As can be seen from FIG. 1 the main conveyer 10 extends towards its other opposite end until a transverse side of the trailer. At the transverse side of the trailer a conveyer connection part 12 connects the main conveyer 10 from the first transportation vehicle 1 towards the second transportation vehicle 1 in a curved direction of 90° so that the main conveyer 10 seamlessly extends from the first transportation vehicle 1 towards the second transportation vehicle 1. While not shown the conveyer connection part 12 may also allow a straight connection between transportation vehicles 1 or a connection between loading areas 3 of two different transportation vehicles 1 having different altitudes.

The second transportation vehicle 1 shown in FIG. 1 comprises eight outfeed conveyers 13, which are provided and arrangement in an analogous manner than the infeed conveyers 5 i.e. foldable attached to the loading area 3 of the second transportation vehicle 1 for unloading an outgoing shipment 14 from the second transportation vehicle 1. Each two of the outfeed conveyers 13 are arranged opposite to each other at the longitudinal sides 7 of the second transportation vehicle 1. The embodiment as shown in FIG. 2 comprises a single transportation vehicle 1 such that the infeed conveyers 5 and the outfeed conveyers 13 are arranged on the same loading area 3 respectively on the same transportation vehicle 1.

Shipments 2 being conveyed via the main conveyer 10 onto the second transportation vehicle 1 pass a sorting device 15, which sorts the shipments 2 respectively incoming shipments 6 according to the scanning information obtained from the scanning device 11 for unloading the incoming shipments 6 as outgoing shipments 4 via a respective outfeed conveyer 13. The sorting device 15 is provided as a pop-up sorter which assigns the shipments 2 respectively the incoming shipments 6 conveyed by the main conveyer 10 to a respective outfeed conveyer 13. At the transverse side of the outfeed conveyer 13 facing away from the loading area a cage, van, bike or small truck may take on the unloaded outgoing shipments 14. The embodiment of FIG. 2 shows the sorting device 15 installed on the same transportation vehicle 1 as the scanning device 11. In an alternative not shown embodiment the sorting device 15 can be provided as a shoe sorter and/or a pop-up wheel sorter for associating the shipments 2 respectively incoming shipments 6 to the respective outfeed conveyer 13.

The main conveyer 10 as shown in FIG. 1 extends on the second transportation vehicle 1 from one transverse side at which the conveyer connection part 12 is provided towards the opposite transverse side and runs at least partly in parallel or together with the sorting device 15. At the opposite transverse side the second transportation vehicle 1 comprises an outfeed link conveyer 16, which is attached in a foldable manner to the loading area 3 i.e. in an analogous manner as the outfeed conveyer 13. The outfeed link conveyer 16 is connected to the sorting device 15 for unloading an outgoing shipment 14 from the transportation vehicle.

While the outfeed conveyers 13 are attached to longitudinal sides 7 of the second transportation vehicle 1 and extend perpendicular thereto away from the longitudinal sides 7, the outfeed link conveyer 16 is attached to a transverse side of the second transportation vehicle 1 and extends perpendicular thereto in direction of the longitudinal sides 7 of the second transportation vehicle 1. The outfeed link conveyer 16 is adapted for connecting to a locally fixed conveyer 17 of an existing building 18 of a logistics provider and thus to an existing conveying system of the existing building 18. FIG. 2 shows a back view of the transportation vehicle 1 with the outfeed link conveyer 16 in the folded position.

For controlling operations of the infeed conveyers 5, the outfeed conveyers 13, the scanning device 15, the main conveyer 10, the outfeed link conveyer 11 and the sorting device 15 the transportation vehicle 1 comprises a computer control 19 having a microprocessor with respective programming instructions executed thereon. The connection part 12 comprises a computer connection for interconnecting the infeed conveyers 5, the outfeed conveyers 13, the scanning device 15, the main conveyer 10, the outfeed link conveyer 11 and the sorting device 15 of the two transportation vehicles 1. The computer control 19 is furthermore adapted for interconnecting with the existing conveying system of the existing building 18 such that the transportation vehicles 1 can provide additional infeed conveyers 5 and the outfeed conveyers 13 to the existing conveying system.

Depicted or described connections between components are generally to be understood to be functional connections. They can be implemented as direct links or as indirect links via several other components. The order of presented actions is not mandatory; alternative orders are possible. Actions can be implemented in different ways. They could be implemented in software using program instructions; or they could be implemented in hardware; or they could be implemented making use of a combination of hardware and software. It is to be understood that the described embodiments are examples only, which may be modified and/or supplemented in many ways within the scope of the claims. In particular, any feature described for a particular embodiment can be used by itself or in combination with other features in any other embodiment. Each feature that has been described for an embodiment of a particular category can also be used in an equivalent manner in an embodiment of any other category.

The invention claimed is:

1. At least one transportation vehicle for mobile sorting of shipments, the transportation vehicle comprising
    a loading area arranged on the transportation vehicle,
    at least one infeed conveyer foldable attached to the loading area for loading an incoming shipment onto the transportation vehicle,
    at least two outfeed conveyers foldable attached to the loading area for unloading an outgoing shipment from the transportation vehicle,
    a scanning device arranged on the loading area adjacent to the at least one infeed conveyer and configured to scan the incoming shipment for obtaining a scanning information,
    a main conveyer arranged on the loading area and configured to convey the incoming shipment past the scanning device towards a sorting device, and
    the sorting device configured to sort the scanned incoming shipment according to the scanning information towards one of the outfeed conveyers for unloading the incoming shipment as an outgoing shipment;
    wherein the transportation vehicle comprises a side wall at least partially surrounding the loading area and arranged at an edge of the loading area, the at least one infeed conveyer and the at least two outfeed conveyers are foldable from a loading position for loading the incoming shipment and unloading the outgoing shipment and a folded position for moving the transportation vehicle, and the at least one infeed conveyer and the at least two outfeed conveyers form a part of the side wall in the folded position.

2. The at least one transportation vehicle according to claim 1, wherein the at least one infeed conveyer and the at least two outfeed conveyers form a seamless part of the side wall in the folded position or wherein the side wall comprises a side curtain and the at least one infeed conveyer and the at least two outfeed conveyers closely fit the side curtain in the folded position.

3. The at least one transportation vehicle according to claim 1, wherein the at least one infeed conveyer or the at least two outfeed conveyers comprise an upper side comprising conveyer rolls and a smooth bottom side facing away from the conveyer rolls.

4. The at least one transportation vehicle according to claim 1, wherein the at least one transportation vehicle is provided as a trailer or as a truck.

5. The at least one transportation vehicle according to claim 1, wherein the loading area comprises two opposite longitudinal sides extending in driving direction of the transportation vehicle, the at least one transportation vehicle comprising an even plurality of infeed conveyers arranged in pairs opposite to each other at the longitudinal sides of the loading area.

6. The at least one transportation vehicle of claim 5, wherein the loading area comprises two opposite longitudinal sides extending in a driving direction of the transportation vehicle, the at least one transportation vehicle comprising an even plurality of outfeed conveyers arranged in pairs opposite to each other at the longitudinal sides of the loading area.

7. The at least one transportation vehicle according to claim 1, wherein the loading area comprises two opposite longitudinal sides extending in a driving direction of the transportation vehicle and at least one transverse side arranged perpendicular thereto, the at least one transportation vehicle comprising an outfeed link conveyer foldable attached to the loading area for unloading an outgoing shipment from the transportation vehicle, wherein the outfeed link conveyer is arranged on the transverse side or on the longitudinal side of the loading area and adapted for connecting to a locally fixed conveyer.

8. The at least one transportation vehicle according to claim 1, wherein the scanning device comprises a top read scanning tunnel, a two-way sorting device or a presorting device.

9. The at least one transportation vehicle according to claim 1, comprising a computer control configured for controlling the at least one infeed conveyer, the at least two outfeed conveyers, the scanning device, the main conveyer and the sorting device.

10. The at least one transportation vehicle of claim 1, comprising a computer control configured for electrically connecting to a fixed computer control of a locally fixed conveyer.

11. The at least one transportation vehicle according to claim 1, wherein the sorting device is provided as a pop-up sorter, a shoe sorter or a pop-up wheel sorter.

12. At least one transportation vehicle for mobile sorting of shipments, the transportation vehicle comprising
   a loading area arranged on the transportation vehicle,
   at least one infeed conveyer foldable attached to the loading area for loading an incoming shipment onto the transportation vehicle,
   at least two outfeed conveyers foldable attached to the loading area for unloading an outgoing shipment from the transportation vehicle,
   a scanning device arranged on the loading area adjacent to the at least one infeed conveyer and configured to scan the incoming shipment for obtaining a scanning information,
   a main conveyer arranged on the loading area and configured to convey the incoming shipment past the scanning device towards a sorting device, and
   the sorting device configured to sort the scanned incoming shipment according to the scanning information towards one of the outfeed conveyers for unloading the incoming shipment as an outgoing shipment;
   comprising a first transportation vehicle and at least one second transportation vehicle, wherein the at least one infeed conveyer and the scanning device are arranged on the first transportation vehicle, the at least two outfeed conveyers and the sorting device are arranged on the at least one second transportation vehicle and the main conveyer extends from the first transportation vehicle towards the at least one second transportation vehicle.

13. The at least one transportation vehicle according to claim 12, comprising a conveyer connection part adapted for connecting the main conveyer between the first transportation vehicle and the at least one second transportation vehicle in a straight, curved or lowering direction.

14. The at least one transportation vehicle of claim 12, wherein the first transportation vehicle is provided as a truck and the at least one second transportation vehicle is provided as a trailer.

15. The at least one transportation vehicle according to claim 12, wherein the at least one infeed conveyer or the at least two outfeed conveyers comprise an upper side comprising conveyer rolls and a smooth bottom side facing away from the conveyer rolls.

16. The at least one transportation vehicle according to claim 12, wherein the sorting device is provided as a pop-up sorter, a shoe sorter or a pop-up wheel sorter.

17. At least one transportation vehicle for mobile sorting of shipments, the transportation vehicle comprising
   a loading area arranged on the transportation vehicle,
   at least one infeed conveyer foldable attached to the loading area for loading an incoming shipment onto the transportation vehicle,
   at least two outfeed conveyers foldable attached to the loading area for unloading an outgoing shipment from the transportation vehicle,
   a scanning device arranged on the loading area adjacent to the at least one infeed conveyer and configured to scan the incoming shipment for obtaining a scanning information,
   a main conveyer arranged on the loading area and configured to convey the incoming shipment past the scanning device towards a sorting device, and
   the sorting device configured to sort the scanned incoming shipment according to the scanning information towards one of the outfeed conveyers for unloading the incoming shipment as an outgoing shipment;
   wherein the at least one infeed conveyer or the at least two outfeed conveyers comprise a transverse side and are attached with their transverse side for swivel movement to the loading area.

18. The at least one transportation vehicle according to claim 17, wherein the at least one infeed conveyer or the at least two outfeed conveyers comprise an upper side comprising conveyer rolls and a smooth bottom side facing away from the conveyer rolls.

19. The at least one transportation vehicle according to claim 17, wherein the at least one transportation vehicle is provided as a trailer or as a truck.

20. The at least one transportation vehicle according to claim 17, comprising a computer control configured for controlling the at least one infeed conveyer, the at least two outfeed conveyers, the scanning device, the main conveyer and the sorting device.

* * * * *